United States Patent [19]

Kawai et al.

[11] 4,188,523
[45] Feb. 12, 1980

[54] ROLL ELECTRODE FOR USE IN A SEAM WELDING MACHINE

[75] Inventors: Jun Kawai; Jun-ichi Homma; Saburo Watanabe, all of Tokyo; Masahiro Watanabe, Yokohama, all of Japan

[73] Assignees: Nippon Electric Co., Ltd.; Fuji Industry Co., Ltd., both of Yokohama, Japan

[21] Appl. No.: 915,746

[22] Filed: Jun. 15, 1978

[30] Foreign Application Priority Data

| Jun. 15, 1977 [JP] | Japan | 52-71371 |
| Jun. 15, 1977 [JP] | Japan | 52-71372 |
| Jul. 27, 1977 [JP] | Japan | 52-90701 |
| Jul. 27, 1977 [JP] | Japan | 52-90702 |
| Jul. 27, 1977 [JP] | Japan | 52-90703 |
| Jul. 27, 1977 [JP] | Japan | 52-90704 |

[51] Int. Cl.² ............... B23K 11/06; H01R 39/30; C22C 28/00
[52] U.S. Cl. .................. 219/83; 219/71; 219/84; 339/5 L; 75/134 T
[58] Field of Search .......... 219/84, 71, 81, 83; 339/5 L, 8 L, 118 R, 118 RY; 75/134 T, 169; 165/81, 83

[56] References Cited

U.S. PATENT DOCUMENTS

| 2,147,699 | 2/1939 | Hardiman | 165/81 |
| 2,523,789 | 9/1950 | Teare | 75/169 |
| 2,717,840 | 9/1955 | Bosch | 75/134 T |
| 3,501,611 | 3/1970 | Opprecht | 219/84 |
| 3,622,944 | 11/1971 | Tsuchiya | 339/118 R |

FOREIGN PATENT DOCUMENTS

| 2351534 | 3/1975 | Fed. Rep. of Germany | 219/84 |
| 50-101208 | 11/1975 | Japan | 75/134 T |
| 1291076 | 9/1972 | United Kingdom | 339/5 L |
| 1456313 | 11/1976 | United Kingdom | 339/5 L |
| 524064 | 10/1976 | U.S.S.R. | 165/83 |

*Primary Examiner*—Bruce A. Reynolds
*Assistant Examiner*—Keith E. George
*Attorney, Agent, or Firm*—Charles E. Pfund

[57] ABSTRACT

The roll electrode comprises a stator member and a rotor member surrounding the stator member with an annular gap therebetween and a liquid metal is filled in the gap. The liquid metal has a composition consisting of $69.5 \pm 5.0$ atomic % of Ga, $15.2 \pm 1.0$ atomic % of In, $6.1 \pm 1.0$ atomic % Sn, $4.5 \pm 0.8$ atomic % of Zn, $3.2 \pm 0.5$ atomic % of Ag and $1.5 \pm 0.5$ atomic % of Al.

8 Claims, 9 Drawing Figures

ROLL ELECTRODE FOR USE IN A SEAM WELDING MACHINE

BACKGROUND OF THE INVENTION

This invention relates to a roll electrode of a seam welding machine and a method of operating the same.

A prior art roll electrode comprises an internal stator and a rotor mounted thereon and mercury is filled in a space defined between the stator and the rotor. Such construction is disclosed, for example, in U.S. Pat. No. 3,501,611 dated Mar. 17, 1970.

However, the mercury causes various problems as follows. For example, since the wetting property of mercury is small the contact resistance between it and the surrounding metals is high. Moreover, mercury forms amalgam with surrounding metals, thus increasing resistance. In addition, the poisonous property of mercury is not advantageous especially in a seam welder for manufacturing cans adapted to contain foodstuffs.

However, as it is extremely difficult to perfectly prevent leakage of mercury from the roll electrode various attempts have been made to obviate the use of mercury. For example, liquid metals have been developed. However, presently available liquid metal which is stable at room temperature and not affected by air or moisture is limited to Ga-In alloys. However, the solidifying point of these alloys is higher than that of mercury and the volume thereof increases when they solidify so that when these alloys are substituted for mercury in the roll electrode of the seam welder, they solidify to fracture the roll electrode when the temperature decreases below 5° C.

SUMMARY OF THE INVENTION

Accordingly, it is an object of this invention to provide an improved roll electrode of a seam welding machine which uses harmless liquid metal which would not damage the electrode during its use.

Another object of this invention is to provide a roll electrode of a seam welding machine utilizing liquid metal having an improved wetting property.

Still another object of this invention is to provide an improved roll electrode of a seam welding machine in which the electric contact between the rotor and the stator of the roll electrode has been improved over prior art construction.

A further object of this invention is to provide an improved roll electrode of a seam welding machine capable of reducing the power consumption of the welding machine.

According to one aspect of this invention there is provided a roll electrode for use in a seam welding machine comprising a stator member, a rotor member surrounding the stator member with an annular gap therebetween, a bearing member for rotatably supporting the rotor member to rotate about the axis of the stator member and electroconductive liquid filled in the annular gap for electrically connecting the rotor member to the stator member, wherein the electroconductive liquid comprises a liquid metal consisting of 69.5±5.0 atomic % of Ga, 15.2±1.0 atomic % of In, 6.1±1.0 atomic % of Sn, 4.5±0.8 atomic % of Zn, 3.2±0.5 atomic % of Ag and 1.5±0.5 atomic % of al.

According to another aspect of this invention there is provided a method of operating a seam welding machine including a water cooled roll electrode filled with an electroconductive liquid metal, said method comprising the steps of passing welding current of a predetermined value through the roll electrode for a predetermined time before commencing welding operation, operating the welding machine by passing the welding current and cooling water through the roll electrode, stopping the operation of the welding machine and then passing a constant current having a value of from 0.01 to 0.1% of the welding current through the roll electrode for a predetermined time.

DESCRIPTION OF THE PREFERRED EMBODIMENTS

Figure 2:
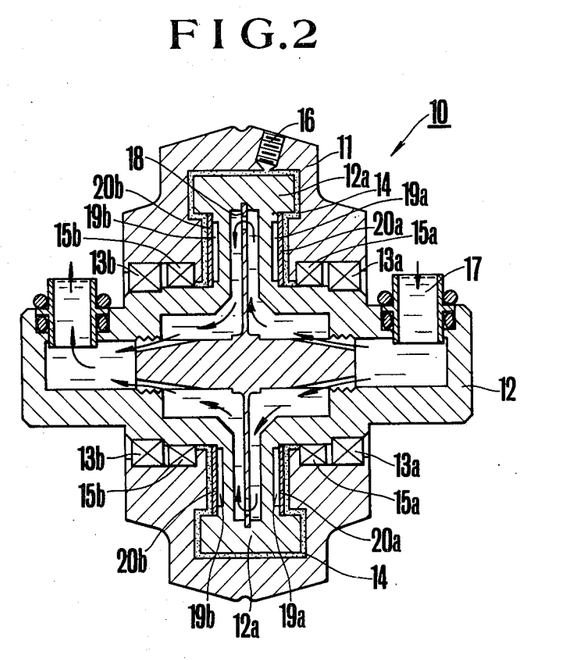
FIGS. 2 through 9 are longitudinal sectional views showing various modifications of this invention.

A preferred embodiment of this invention is shown in FIG. 2. A roll electrode 10 shown in FIG. 2, comprises a rotor 11 made of copper, for example, and rotatably mounted on a stator 12, also made of copper, by bearings 13a and 13b. The rotor 11, the stator 12 and sealing members 15a and 15b define an annular gap and electroconductive liquid or liquid metal 14 (to be described later) fills the gap. The liquid metal 14 is poured into the gap through a pouring port 16 provided for the rotor 11. A cooling water chamber 17 is formed in the axial portion of the stator 12 and a baffle plate 18 is provided in the cooling water chamber 17 for guiding the cooling water to the periphery of the stator 12.

The liquid metal 14 utilized in this invention has a composition, in atomic %, of 69.5±5.0 % of Ga, 15.2±1.0 % of In, 6.1±1.0 % of Sn, 4.5±0.8 % of Zn, 3.2±0.5 % of Ag and 1.5±0.5 % of Al. This liquid metal was invented by us and disclosed in Japanese patent laid open specification No. 101,208 of 1975. The liquid metal has a melting point of about 0°–3° C. and has small poisonous property and reactivity against air like the prior art gallium alloys. Accordingly, when it is used for the roll electrode of a seam welding machine it is possible to eliminate the problem of poison caused by mercury. Moreover, as the solidifying point of this liquid metal is 0°–3° C. which is lower than that of the prior art Ga-In alloys it is possible to decrease the possibility of rupturing the electrode.

The liquid metal is prepared by the following method. Thus, Ga, In, Sn, Zn, Ag, Al are weighed and admixed in pure argon atmosphere such that their composition ratio, in terms of atomic percent, will be 69.5±5.0 % of Ga, 15.2±1.0 % of In, 6.1±1.0 % Sn, 4.5±0.8 % of Zn, 3.2±0.5 % of Ag and 1.5±0.5 % of Al. The mixture is heated and stirred at 450° C. for 8 hours and then cooled to room temperature.

In the practical seam welding machine, a pair of roll electrodes of this invention are arranged to oppose each other, and superposed metal sheets to be seam-welded are passed through the electrodes while a suitable welding pressure is supplied across the electrodes. The heat generated in the roll electrodes is removed by the cooling water flowing through the cooling water chamber 17. The baffle plate 18 guides the cooling water to the periphery of the stator 12 as shown by arrows thus preventing the temperature of the roll electrode 10 from rising above 30° C.

While the welding machine is not used, the liquid metal is maintained at room temperature. Even when the room temperature decreases below 10° C., since the solidifying point of the liquid metal is 0°–3° C., there is no tendency of rupture of the roll electrode caused by the solidification of the liquid metal under normal operating condition.

The liquid metal having a low solidifying point of 0°–3° C. comprises an eutectic alloy consisting of 6 constituents described above. When the composition departs from the range specified above the melting point increases greatly, so that such alloy can not be used. The liquid metal having the composition described above has a small wetting property against glass.

Accordingly, we have greatly improved the wetting property of the liquid metal by dispersing therein 0.005 to 0.05% by weight of a powder of an impurity having an average particle size of about 2.5 microns. When the percentage of the impurity is less than 0.005% by weight the degree of improving the wetting property is small whereas when the percentage is increased beyond 0.05% by weight, the incorporated impurity tends to coagulate. The impurity may comprise oxides such as $SiO_2$, $Al_2O_3$, etc, nitrides, fluorides, metals, semimetals, or mixtures thereof. However, it is essential that the impurity should be finely divided particles that are wet by the liquid metal and do not affect the chemical composition thereof.

The liquid metal consisting of 69.5±5.0 atomic % of Ga, 15.2±1.0 atomic % of In, 6.1±1.0 atomic % of Sn, 4.5±0.8 atomic % of Zn, 3.2±0.5 atomic % of Ag and 1.5±0.5 atomic % of Al and dispersed with 0.005–0.05 % by weight of said impurity is poured into about one half of the volume of the annular gap between the stator 12 and the rotor 11 through the pouring port 16.

About 500 cans were seam-welded by using the roll electrodes 10 described above and it was found that the result of welding is the same as that obtainable with prior art roll electrodes filled with mercury. When tested at a temperature of −5° C. which is lower than the melting point of the liquid metal the roll electrodes did not rupture. As above described, it is improtant that the quantity of the liquid metal should be selected such that it fills about 30 to 75% of the volume of the gap.

More particularly, when the degree of filling the liquid metal 14 is smaller than 30%, the electrical resistance between the stator 12 and rotor 11 increases greatly whereas when the degree exceeds 75% it is impossible to absorb the increase in the volume caused by the solidification of the liquid metal, thus resulting in the rupture of the roll electrodes.

To further prevent solidification of the liquid metal, the following improvements were made. According to one method, super cooling phenomenon is used which is performed under a stable condition in which any noticeable vibration is not imparted to the liquid metal consisting of an eutectic alloy. For example, a liquid metal consisting of an eutectic alloy having a composition of 69.5±5.0 atomic % of Ga, 15.2±1.0 atomic % of In, 6.1±1.0 atomic % of Sn, 4.5±0.8 atomic % of Zn, 3.2±0.5 atomic % of Ag and 1.5±0.5 atomic % of Al has a solidifying point of about 3° C. However, when this alloy is super-cooled it does not solidify even at −20° C. With this super-cooled liquid metal it is possible to accurately prevent rupture of the roll electrode due to increase in the volume of the liquid metal when it solidifies.

At the time of seam welding, the welding current flows from the stator 12 to the rotor 11 or vice versa. After interrupting the welding current a small definite current is passed in the same or opposite direction as the welding current through the rotor 11 and stator 12 or only through the stator 12. When a current of one ampere is passed for 10 hours the liquid metal described above is stabilized by super-cooling phenomenon so that it does not solidify even when the room temperature has decreased to −5° C. When the small current is passed only through the stator 12, it is sufficient to pass a constant current of 10 amperes through the stator for about 4 hours to attain the same object. Where constant current of 100 amperes is passed through the rotor and stator or only through the stator without passing the cooling water, the temperature rise caused by current flow becomes excessive thus failing to super-cool. Moreover, when the constant current exceeds 10 amperes, the power consumption is excessive. The above experiments were made on a welding machine having a current rating higher than 10,000 amperes. While in the above experiments, the flow of the cooling water was stopped immediately after completion of the seam welding operation, the water flow may be continued for about 10 to 20 minutes after interruption of the welding current. Then the time for stabilizing the liquid metal by the flow of the constant current can be decreased.

Prior to the seam welding, it is necessary to gradually increase the temperature of the liquid metal above the solidification temperature while maintaining the stable super cooling phenomenon. Such condition can be fulfilled by passing the seam welding current for about one hour while maintaining the rotor at standstill and cooling the same by water. When the seam welding current is passed immediately after start through the rotor and the stator the super cooling effect is nullified thus causing solidification of the liquid metal and rupturing of the roll electrode. Operation of finalizing said constant current, permitting only welding current to flow before starting and circulating or closing cooling water and so forth may be controlled by providing a proper sequence control circuit or an automatic control circuit.

As has been described above it is advantageous that the constant current which is passed after the interruption of the welding current should be a small current equal to 0.01 to 0.1% of the welding current. The small current in this range causes super cooling of the liquid metal while the flow of the welding current before the welding operation gradually nullify the effect of super cooling thereby enabling seam welding. Accordingly, it is possible to provide a roll electrode in which the liquid metal does not solidify even at −5° C.

Figure 1:
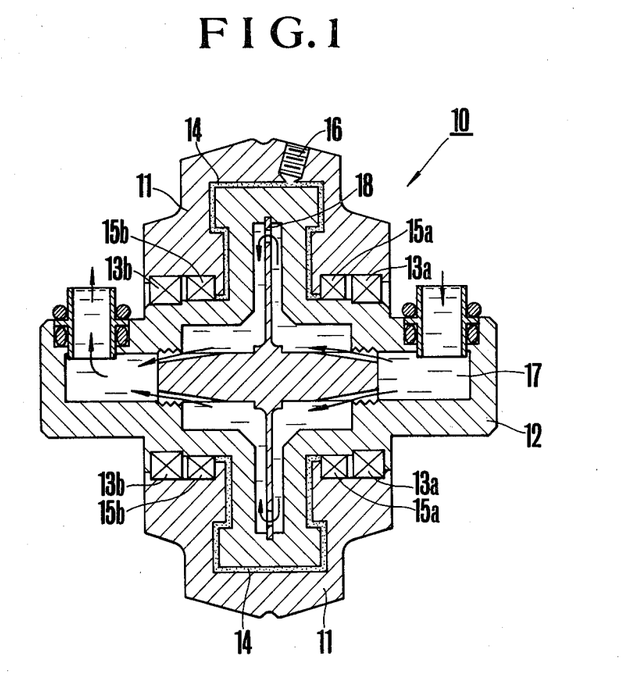
FIG. 1 is a longitudinal sectional view showing one embodiment of the roll electrode of a seam welding machine embodying the invention.

Even when the liquid metal solidifies, if the increase in the volume thereof can be absorbed its effect can be alleviated. In the modified embodiments shown in FIGS. 2–7, means for absorbing the increase of the volume is provided in the annular gap between the rotor and the stator. In these figures, elements corresponding to those shown in FIG. 1 are designated by the same reference numerals.

In the embodiment shown in FIG. 2, annular grooves 19a and 19b are formed on both side walls of the radial portion 12a of the stator 12 and these annular grooves are closed by flexible annular thin plates 20a and 20b to form means for absorbing increase in the volume. Thus, when the liquid metal 14 solidifies to increase its volume, the thin plates 20a and 20b flex toward each other to allow the increase in the volume.

When tested in a seam welding machine the roll electrodes shown in FIG. 2 gave the same satisfactory results as the prior art roll electrodes using mercury. Furthermore, the roll electrodes were not damaged when tested repeatedly under a varying temperature condition from room temperature to −5.5° C.

Figure 3:
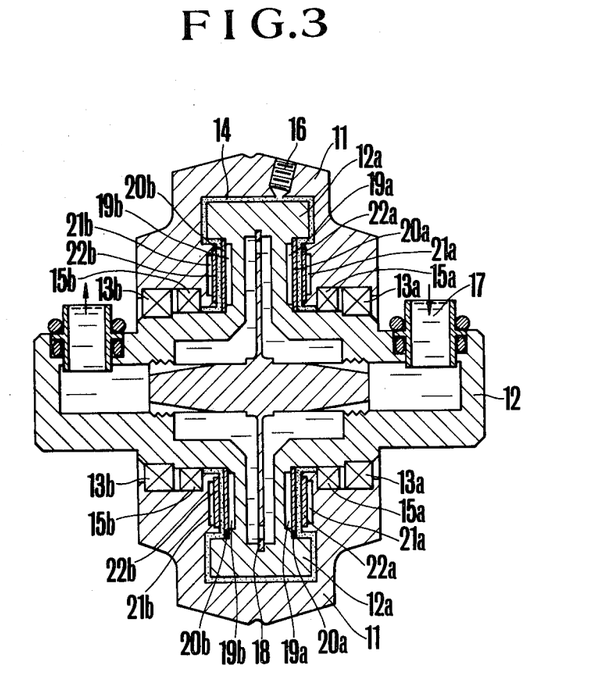

In another embodiment shown in FIG. 3, the means for absorbing the increase in the volume shown in FIG. 2 is provided for both the rotor and the stator. More particularly annular grooves 21a and 21b and annular flexible thin plates 22a and 22b which close the annular grooves are provided for the rotor 11 in a position opposing the absorbing means provided for the stator 12. This modification functions in the same manner as that shown in FIG. 2.

Figure 4:
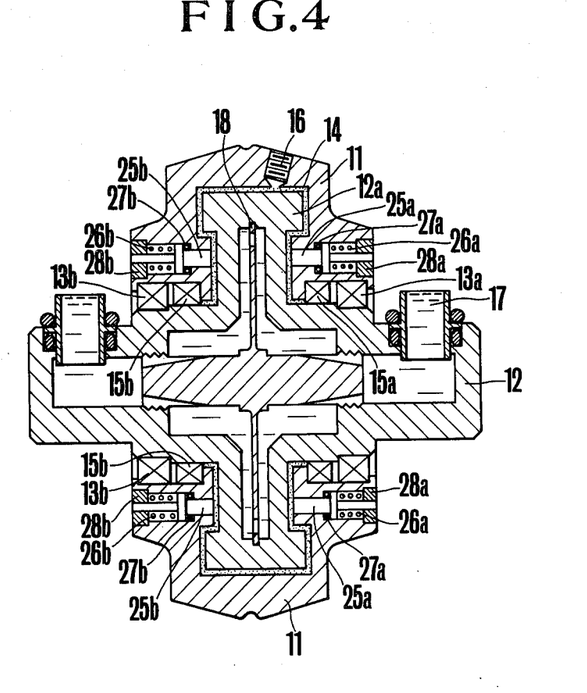
Figure 5:
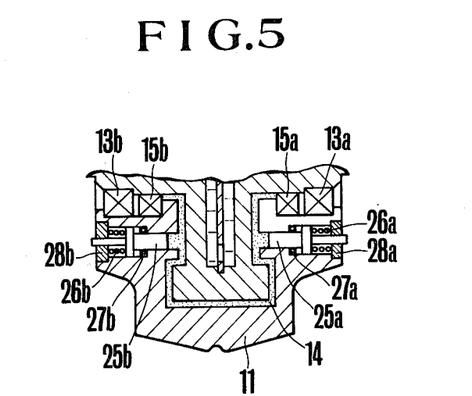

FIGS. 4 and 5 show still further embodiment of this invention. In the embodiments shown in FIGS. 4 and 5, the means for absorbing the increase of volume comprises pistons 25a, 25b provided for the opposite side walls of the rotor 11, springs 26a, 26b, spring seats 28a, 28b and sealing members 27a, 27b. These pistons 25a, 25b are urged outwardly when the liquid metal 14 solidifies. FIG. 4 shows a condition in which the liquid metal 14 is not solidified whereas FIG. 5 shows a condition in which the liquid metal has solidified.

Figure 6:
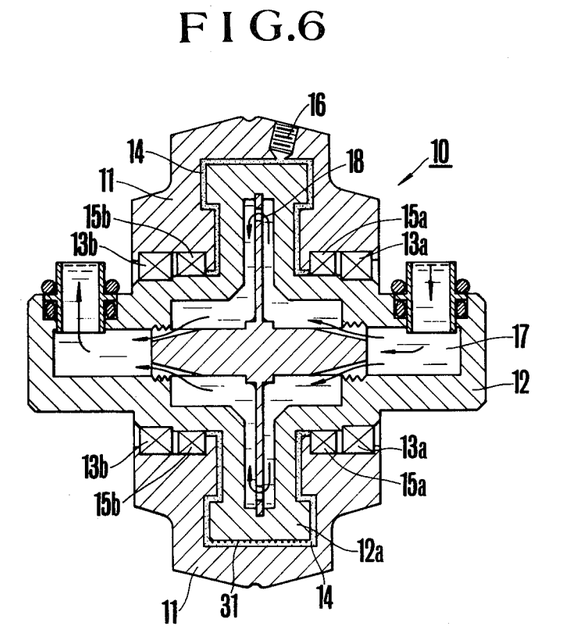

It is also possible to prevent the rupture of the roll electrode by causing the liquid metal to solidify at a specified position. Such embodiment is shown in FIG. 6 in which elements corresponding to those shown in FIG. 1 are designated by the same reference numerals. In FIG. 6, fine particles or powder 31 of one or more of W, Mo, V, Ti or mixture thereof or alloys therefrom are secured by fusion, for example, to the lower surface of the annular portion 12a of the stator 12 facing the gap.

In one example, 69.5 atomic % of Ga, 15.2 atomic % of In, 6.1 atomic % of Sn, 4.5 atomic % of Zn, 3.2 atomic % of Ag and 1.5 atomic % of Al were weighed and mixed together. The mixture was heated and stirred for 8 hours at 450° C. and then cooled to room temperature to obtain liquid metal. As the fine powder 31, tungsten powder having an average particle size of 15 microns was used. The powder was secured to the stator 12 by plasma fusion technique. The surface of said stator 12 that is faced against the rotor 11 to form an annular gap receives plasma fusion process to be covered with powder 31, which is randamly fixed upon said surface in such a limited area that the total of said limited area becomes about a half of said surface although said powder never fails to exist at the bottom part of the outer flat peripheral side of said annular portion 12a. The liquid metal 14 prepared as above described was poured into the gap between the rotor and stator to fill 90% of the volume of the gap.

The roll electrodes fabricated in this manner were mounted on a seam welding machine to weld 500 cans. The result was excellent as in the prior art roll electrodes using mercury. Moreover the roll electrodes were damaged even when they were repeatedly tested at a temperature of −5.5° C. which is lower than the melting point of the liquid metal 14. In these tests it was considered that the liquid metal has solidified, but the roll electrodes were not damaged. It is considered that the powder of tungsten acts as nuclei for starting solidification so that solidification starts from bottom and the increase in the volume due to solidification is absorbed by the upper space.

In the second example, tungsten powder 31 was fused only to the lower portion of the stator and liquid metal consisting of 69.5±5.0 atomic % of Ga, 15.2±1.0 atomic % of In, 6.1±1.0 atomic % of Sn, 4.5±0.8 atomic % of Zn, 3.2±0.5 atomic % of Ag and 1.5±0.5 atomic % of Al was prepared in the same manner as above described and poured into the gap between the stator 12 and rotor 11. The roll electrodes thus obtained were tested in a seam welding machine and found satisfactory.

In the third example, the same liquid metal 14 as in the first example was used but its amount was varied in a range of 10 to 99% of the volume of the gap between the rotor 11 and the stator 12. The tungsten powder 31 was fused to the same portion as in the first example. The result of test showed that with the amount of less than 30% the electrical resistance between the rotor and the stator increases whereas when the amount exceeds 97.8%, the inner side of the roll electrode 10 deformes. For this reason amounts between 30 and 97.8% are preferred.

In the fourth example, a powder 31 of Mo, V or Ti having an average particle size of 15 microns was fused to the stator 12 as in the first example to form roll electrodes. These electrodes showed the same result as in the first example. When no powder of Mo, V or Ti was used the roll electrodes which were filled with the liquid metal to occupy more than 30% of the volume of the gap were deformed when the liquid metal solidifies. Further, when the amount of the liquid metal was less than 30% of the volume of the gap, the electrical resistance increased excessively. A 50-50 mixture of the powders of two Mo, V, Ti and W was prepared and fused to the rotor or stator by plasma fusion technique. The result was the same as in the case utilizing a powder of single metal.

The above discussion has been developed in terms of the mixture of 4 elements but it is apparent that powder of alloys derived from said 4 elements, Mo, V, Ti and W, may provide same effect as the embodiments described above. Instead of using powders of elements Mo, V, Ti, W, or mixture thereof or alloys therefrom, fine wires or thin foils thereof can also be used.

Figure 7:
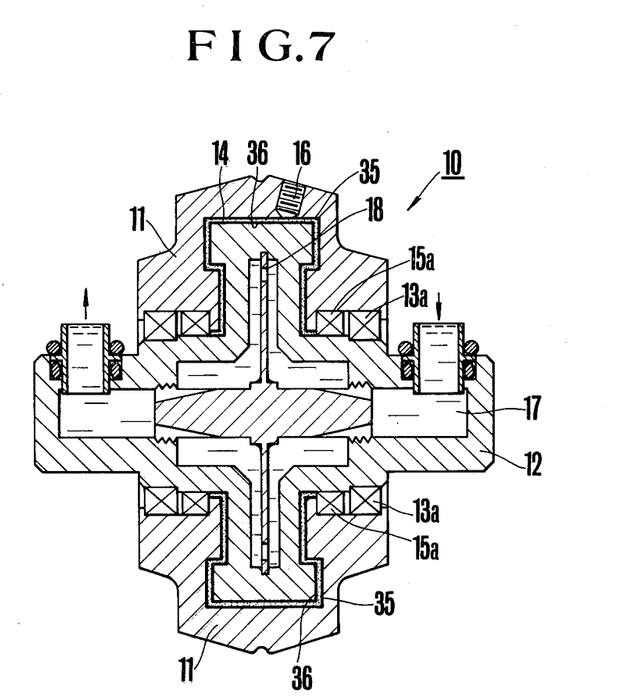

In the modification shown in FIG. 7, the opposing surfaces 35 and 36 of the rotor 11 and the stator 12 are plated with nickel so as to improve the electrical contact between the liquid metal 14 and these surfaces. In this example, nickel was plated to a thickness of about 3 microns. The plated nickel films have a smaller resistivity than the liquid metal and excellent wet property or wettability to the liquid metal.

The roll electrode 10 shown in FIG. 7 was used to manufacture cans with welding current of 10,000 amperes. The temperature of the portion of the roll electrode in contact with the liquid metal 14 was about 30° C. which is lower than that utilizing mercury by about 15° C., and 5° C. lower than the case where nickel platings are not provided.

The power consumption of the prior art roll electrode utilizing mercury is about 50 W, that of the non-nickel plated roll electrode utilizing the liquid metal described above is about 45 W, whereas the power consumption of the roll electrode shown in FIG. 7 is 42 W. A portion of the welding power is lost as heat by the contact resistance between the liquid metal and the rotor and stator, but according to the embodiment shown in FIG. 7, such contact resistance has been decreased by the provision of the nickel films, so that it is possible to reduce power loss and heat generation.

Iron platings may have the same effect as the nickel platings. It should be noted, however, that iron or nickel used in plating has resistivity smaller than said 6-component eutictic alloy and has good wettability to said liquid metal 14.

It is also possible to prevent damage of the roll electrode caused by the increase in the volume when the liquid metal solidifies, by providing heating means for the roll electrode for maintaining it at a temperature higher than the solidifying temperature of the liquid metal.

Figure 8:
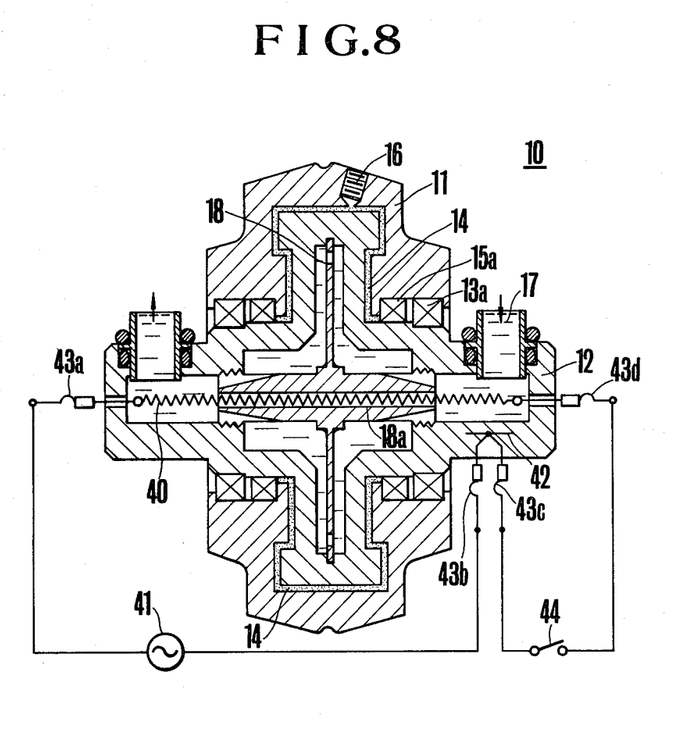

FIG. 8 shows an embodiment of this invention utilizing such heating means. Thus, a nichrome wire heater 40 is provided through the boss 18a of the baffle plate 18 and through the cooling water chamber 17. When the roll electrode 10 is not used and the room temperature lowers, the heater 40 is connected to a source 41, through a switch 44, plugs 43a-43d by a thermostat 42 provided at a suitable portion of the stator 12 and set to operate at a temperature of 10° C., for example. With this arrangement it is possible to maintain the temperature of the roll electrode always above 10° C. In this embodiment, it should be noted that the heater 40 is insulated from the stator 12.

Figure 9:
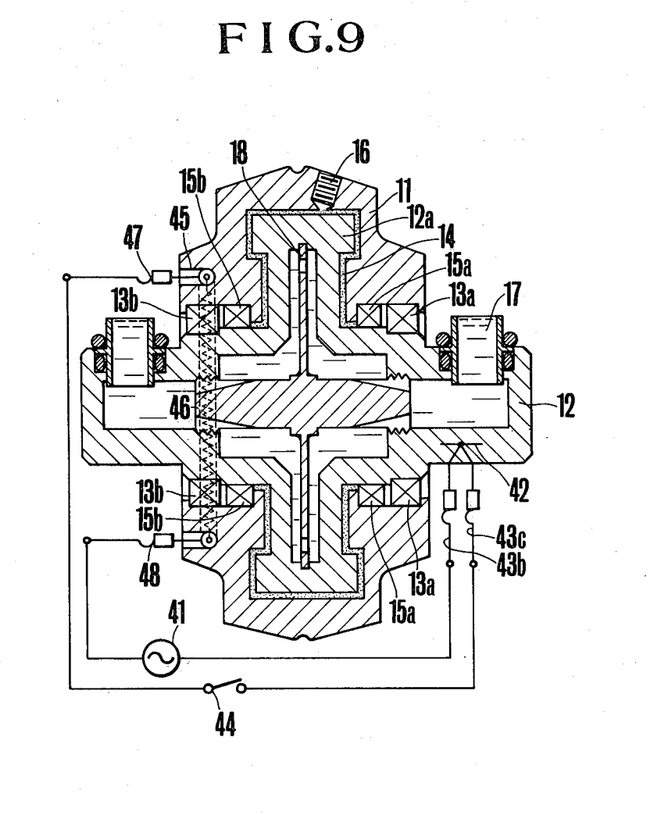

FIG. 9 shows a modification of the embodiment shown in FIG. 8. The embodiment shown in FIG. 9 is different from that shown in FIG. 8 in that the construction and the position of the heating means are different. In FIG. 9, the heating means is provided for the rotor 11. More particularly, an annular groove 45 is formed on one side of the rotor 11 to receive an annular heater 46 which is connected to the source 41 through brushes 47 and 48. The heater 46 is controlled in the same manner as is the embodiment shown in FIG. 8.

While the invention has been shown and described in terms of some preferred embodiments, it should be understood that the invention is not limited to these embodiments and that many changes and modifications will be obvious to one skilled in the art without departing from the scope of the invention as defined in the appended claims.

What is claimed is:

1. In a roll electrode for use in a seam welding machine comprising a stator member, a rotor member surrounding said stator member with an annular gap therebetween, a bearing member for rotatably supporting said rotor member to rotate about the axis of said stator member, and electrical conductive liquid filled in said annular gap for electrically connecting said rotor member to said stator member, the improvement wherein said electrical conductive liquid comprises a liquid metal consisting of 69.5±5.0 atomic % of Ga, 15.2±1.0 atomic % of In, 6.1±1.0 atomic % of Sn, 4.5±0.8 atomic % of Zn, 3.2±0.5 atomic % of Ag and 1.5±0.5 atomic % of Al, and wherein a substance comprising one or more of W, Mo, V, Ti, mixture thereof and alloys therefrom is secured to the lower portion of the outer surface of said stator member which defines said annular gap.

2. A roll electrode according to claim 1 wherein the quantity of said liquid metal corresponds to from 30 to 97.8% of the volume of said air gap.

3. A roll electrode according to claim 1 wherein said secured substance takes the form of a powder.

4. A roll electrode according to claim 1 wherein said secured substance takes the form of fine wires.

5. A roll electrode according to claim 1 wherein said secured substance takes the form of foils.

6. A method of operating a seam welding machine including a water cooled roll electrode filled with an electroconductive liquid metal, said method comprising the steps of passing welding current of a predetermined value through said roll electrode for a predetermined time before commencing welding operation, operating said welding machine by passing said welding current and cooling water through said roll electrode, stopping the operation of said welding machine and then passing a constant current having a value of from 0.01 to 0.1% of said welding current through said roll electrode for a predetermined time.

7. A method according to claim 6, wherein the welding current of the predetermined value is passed through said roll electrode for the predetermined time before commencing the welding operation while preventing the flow of cooling water through said roller electrode.

8. A method according to claim 6 wherein the welding current of the predetermined value is passed through the roll electrode for the predetermined time before commencing the welding operation while passing cooling water through said roll electrode.

* * * * *